Nov. 17, 1970
J. L. SAWYER ET AL
3,540,249
APPARATUS FOR SHAPING PLIABLE WORKPIECES
Filed Dec. 13, 1967
4 Sheets-Sheet 1
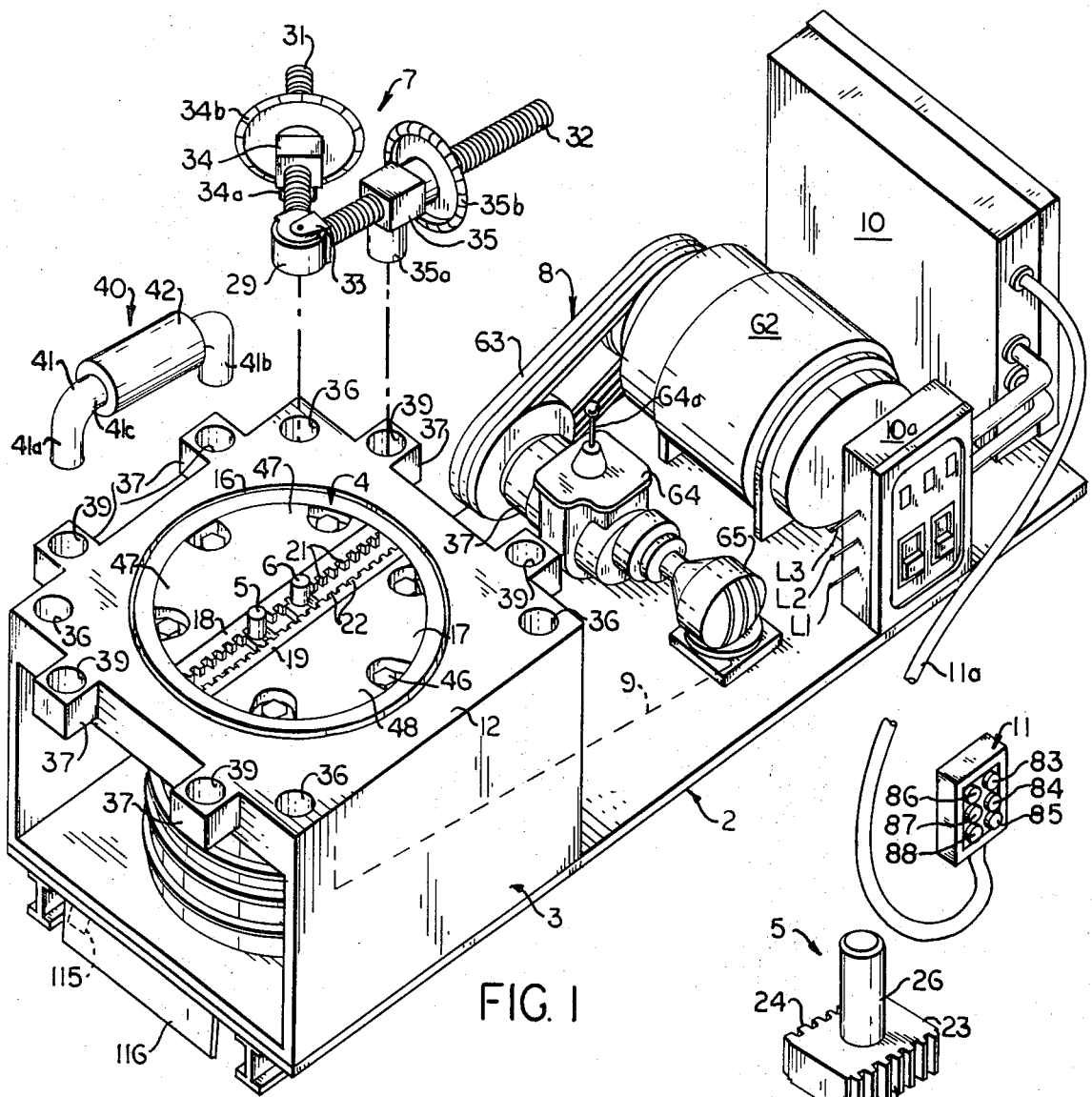
FIG. 1
FIG. 3
FIG. 4
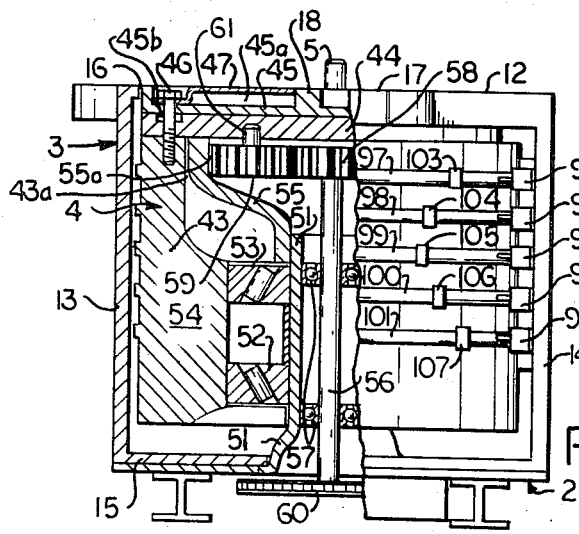
FIG. 2
INVENTORS.
JAMES L. SAWYER
BY JAMES W. HARBERT
*McGrew & Edwards*
ATTORNEYS

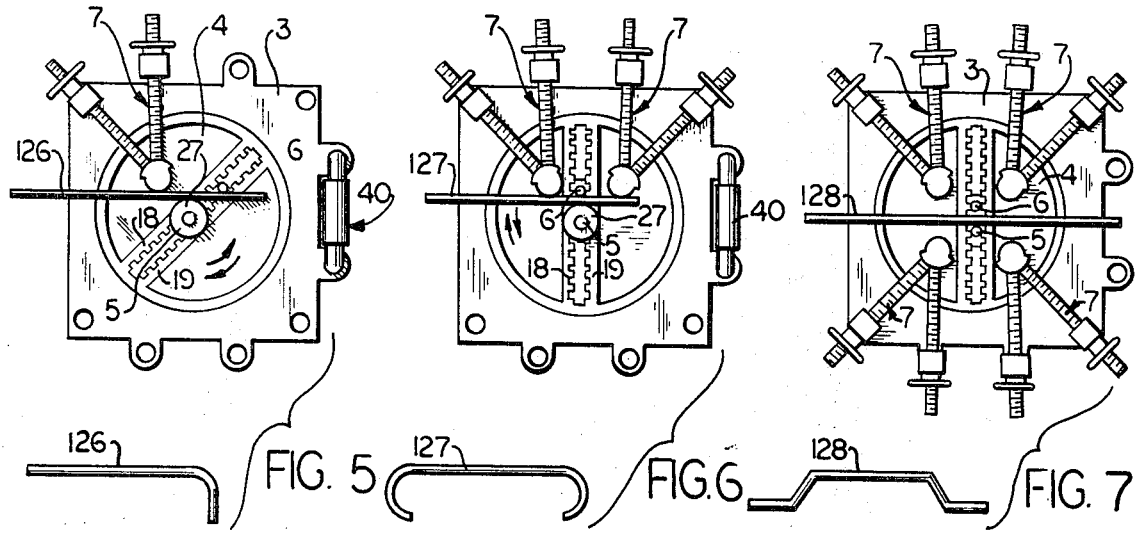
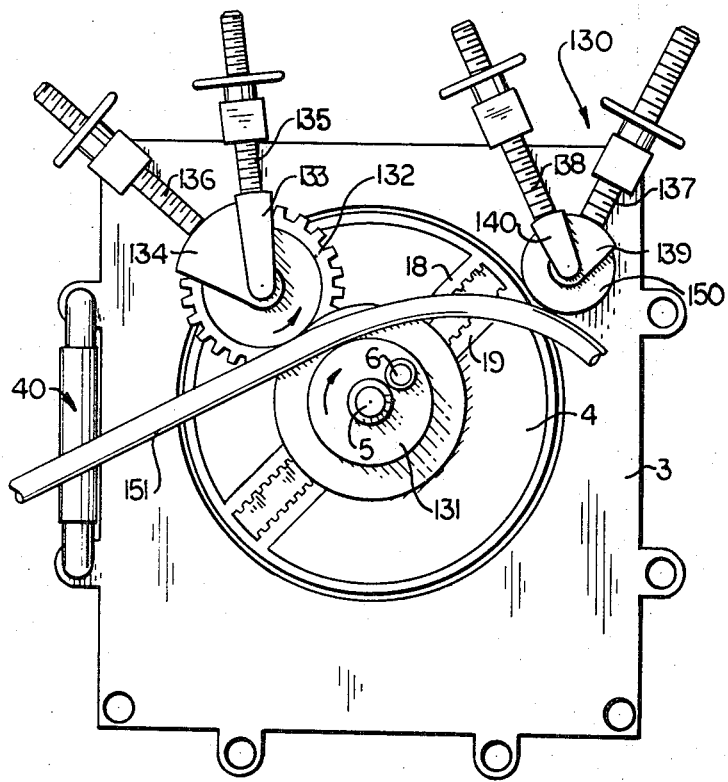
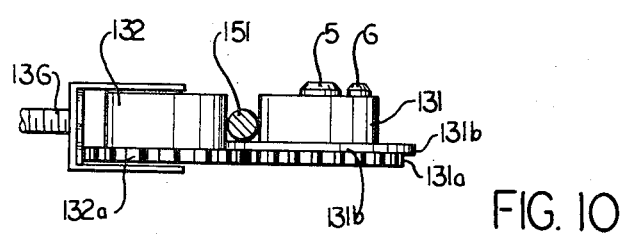

INVENTORS.
JAMES L. SAWYER
BY JAMES W. HARBERT

ATTORNEYS

United States Patent Office 3,540,249
Patented Nov. 17, 1970

1

3,540,249
APPARATUS FOR SHAPING PLIABLE
WORKPIECES
James L. Sawyer, 5209 S. Manitou, Littleton, Colo.
80121, and James W. Harbert, 1783 S. Uinta Way,
Denver, Colo. 80023
Filed Dec. 13, 1967, Ser. No. 690,204
Int. Cl. B21j 7/26
U.S. Cl. 72—22                                    17 Claims

ABSTRACT OF THE DISCLOSURE

Apparatus for shaping various sizes of elongated pliable workieces such as metal bars, rods and the like wherein the workpiece is moved while disposed between upstanding members by a rotary member and its direction of movement is altered so as to provide bending forces in shaping. Points of contact for movement and alteration of the direction of movement of the workpiece are adjustable to different locations on the work supporting surface and demountable therefrom to accomodate various sizes of workpieces and perform various shaping functions. Manual or automatic control may be selected for driving the rotary member and in the automatic cycle may be programmed to perform preselected movements in a repetitive sequence to effect a desired similar shaping of a plurality of similar workieces.

---

This invention relates to apparatus for shaping various types of elongated pliable material and more particularly to apparatus for shaping metal rods, pipes and bars of various gauges and particularly heavier gauge materials such as reinforcing bars. Various types of bar and rod bending machines have been provided heretofore for shaping metal bars used for various types of structural components in the building industry. Such devices when particularly suitable for shaping heavier gauge materials such as reinforcing bars have usually been bulky in size and inefficient in gearing to provide suitable torque and have lacked the capability of handling many different sizes of material and performing a desired shaping with a minimum of operator control.

Accordingly, it is an object of this invention to provide a simple, durable and efficient apparatus for shaping various sizes of pliable workpieces including heavy reinforcing bars.

Another object of this invention is to provide a novel arrangement for shaping pliable bars which may be easily altered for accommodating the forming of different shapes and sizes of bars.

Still another object of this invention to provide an apparatus for shaping workpieces such as reinforcing bars inclusive of assemblies which are easily attached and demounted so as to be capable of performing various types of bending and shaping functions.

It is still a further object of this invention to provide an apparatus for bending and shaping pliable workpieces which may be programmed for treating a plurality of similar workpieces and will shape these pieces to substantially identical dimensions with a minimum of operator control.

Further objects, advantages and capabilities of the invention will become more apparent as the following description proceeds taken in conjunction with the accompanying drawings where like parts have similar reference numerals and in which:

FIG. 1 is a perspective view of the complete assembly of apparatus embodying the present invention suitable for shaping metal workpieces with an arrangement for contacting the workpiece during movement and a roller member supported from the housing illustrated in an elevated position above the housing surface for purposes of a fuller understanding of their positions in the assembly;

FIG. 2 is an end elevation view of the apparatus shown in FIG. 1 with a portion of the left side of the axis of rotation of the exterior wall of the rotary member and housing broken away to show interior parts and particularly the gearing and rotary support arrangement within the housing;

FIG. 3 is a perspective view of one of the two upstanding work engaging members illustrated in operative position on the rack-type member in FIG. 1;

FIG. 4 is a perspective view of a collar member used in combination with the upstanding member shown in FIGS. 1 and 3;

FIG. 5 is a top plan view of the housing and rotary member assembly illustrated in FIG. 1 illustrating the positioning of one work interrupting assembly disposed at one corner of the top work supporting surface of the housing and a bar positioned prior to shaping to provide a curvature at one end of the bar as shown;

FIG. 6 is a top plan view of the housing and rotary member assembly shown in FIG. 1 with a pair of work interrupting assemblies disposed at two corners of the surface of the housing and a bar positioned prior to shaping to provide curvature in both ends of the bar as shown;

FIG. 7 is a top plan view of the housing and rotary member assembly shown in FIG. 1 with work interrupting assemblies disposed at each corner or in each quadrant of the top surface of the housing and a bar positioned prior to shaping so as to provide a linear bending movement in each end of the bar as shown;

FIG. 9 is a top plan view of an alternative form of workpiece shaping apparatus embodying features of the invention which is particularly suitable for providing a continuous curvature in the workpiece.

FIG. 10 is a fragmentary side elevation view of the opposing roller arrangement disposed on the work surface shown in FIG. 9;

Figure 8:
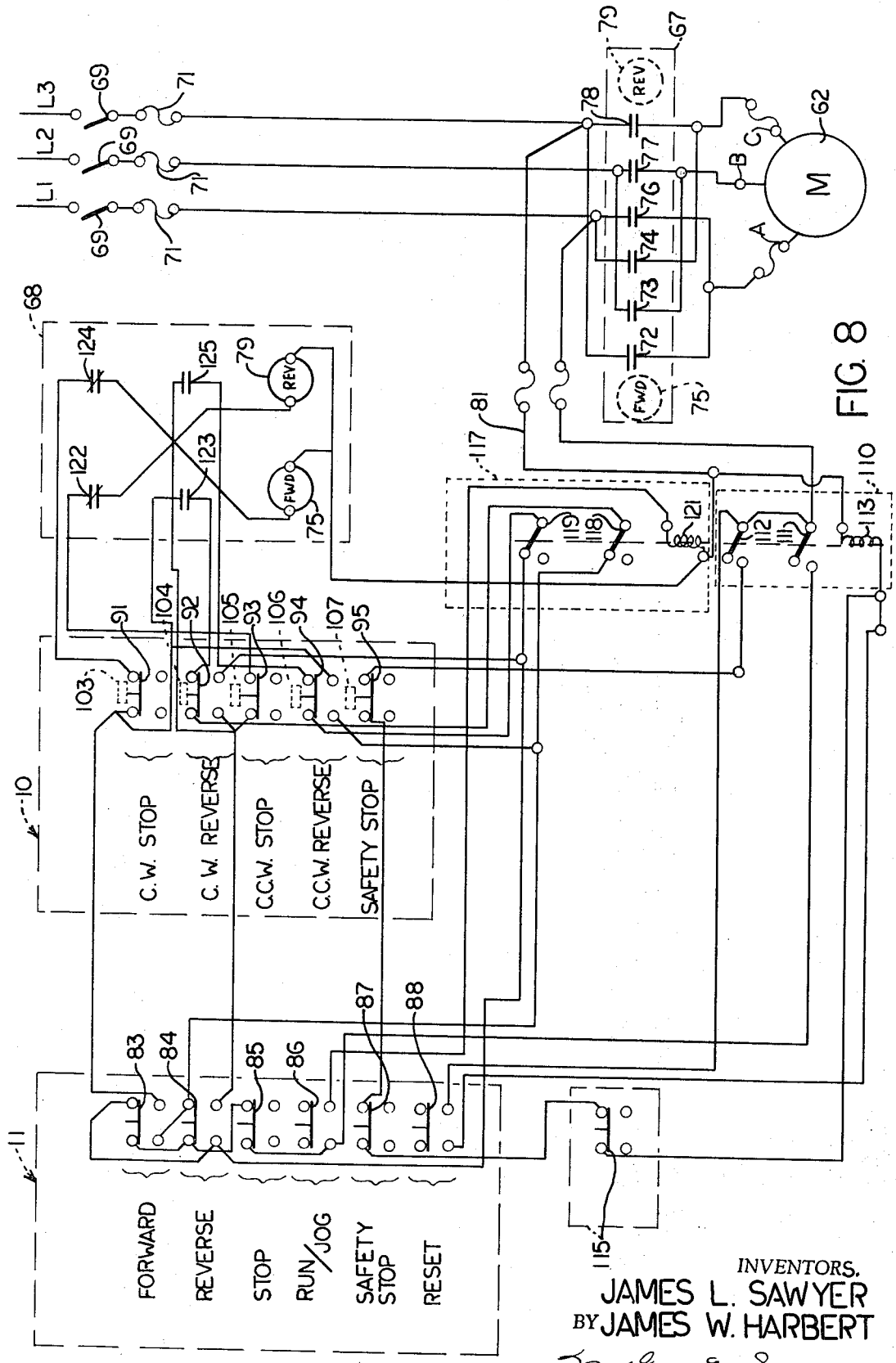
FIG. 8 is a schematic electrical diagram of a manual and automatic control for the apparatus illustrated in FIGS. 1–7.

Referring now to the drawings, there is shown in FIG. 1 apparatus for shaping pliable material, such as metal reinforcing bars, which is supported as an integral assembly on a common base 2 and in general comprises the assembly of a stationary housing 3 of a preferred box-like shaping having a rotary member 4 of a preferred cylindrical shaping arranged for rotation in either direction in the housing, a pair of similar upstanding work engaging members 5 and 6 disposed in spaced relation radially of the cylinder which are carried by the rotary member and a work interrupting assembly 7 is supported from a stationary surface and preferably at any of the four corners on the top surface of the housing 3 although as illustrated in FIG. 1 said assembly is disposed in its detached position above the housing. A drive assembly 8 is carried on the base 2 spaced from the housing 3 and is coupled in driving relation to the rotary member 4 through a suitable power transmission coupling 9 indicated in broken lines for clarity which may be of various known types such as a chain drive connecting chain-type sprockets secured on spaced rotary shafts. The direction and extent of movement of the rotary member 4 by the drive assembly 8 is regulated by a control generally designated by box 10 with a separate enclosed box portion 10a to which the power lines L1, L2 and L3 are connected and a remote control station 11 with an electric cord 11a interconnected between the box 10 and station 11 which may be of a desired length.

The housing 3 as shown is generally box-like in shaping and includes a top wall 12, opposing side walls 13 and 14, a bottom wall 15 and with the other opposing walls herein referred to for purposes of designation as the front end wall which is open and rear end wall (not shown) which is closed. The operator's station for this machine is preferably adjoining the open front end wall and the box-like shaping for the housing provides close working access to the rotary member. The top wall 12 has a circular shaped opening 16 through which the top portion of the upright generally cylindrical rotary member 4 extends and is in closely spaced relation thereto to provide a substantially uniform gap therebetween. While the top of the housing is essentially square with the opening centrally disposed, an oblong top surface with the opening offset is also suitable. The upper surfaces of the top wall 12 and upper end or top wall 17 of the rotary member are essentially flat and disposed in an essentially common horizontal plane to provide a coplanar surface, hereafter referred to as the work supporting surface.

The work engaging members 5 and 6 are arranged for support in spaced relation and radially of the cylindrical rotary member on the upper end or top wall 17 in a pair of opposing rack-type members 18 and 19 disposed in spaced adjacent relation. These rack-type members include opposing serrated portions 21 and 22, respectively, preferably in the form of gear teeth of similar spacing and dimension and supported in spaced relation so as to detachably receive work engaging members 5 and 6. Each of members 5 and 6 is similar in construction and member 5 is more fully illustrated in FIG. 3 and comprises an oblong-shaped base portion 23 having serrated portions 24 and 25 on opposite sides thereof so as to fit in the spacing between rack-type members 18 and 19 in mating relation with the associated serrated portions 21 and 22 and be held against rotation or radial movement therein. An upstanding pin portion 26 is supported on the base portion 23 and extends above the top wall 17 a substantial distance for engagement of the workpiece during rotation of the rotary member as described more fully hereinafter. A bushing or collar member (FIG. 4) having an internal bore 27a of a diameter slightly greater than the diameter of the pin portion 26 is provided with a plurality of sizes of external diameters for sliding over said pin portion to increase the diameter thereof as required for a particular shaping operation.

The interrupting assembly 7 includes a work engaging or roller member 29 having peripheral work contacting surface portions carried above and in spaced proximity to the top surface of the housing and rotary member from spaced points of support on the housing by a demountable support generally including an elongated member 31 arranged with a bearing housing at one end for supporting the roller about an upright axis of rotation and an elongated member 32 arranged with a pivot pin at one end to fit in an aperture in the bearing housing and pivot about the axis of the roller member so that members 31 and 32 will pivot toward and away from each other about this axis.

Each of the elongated members 31 and 32 are supported on portions oppositely of the roller by bodies or blocks 34 and 35, respectively, shown as generally oblong in shape. These bodies 34 and 35 are preferably provided with a movable internal threaded portion attached to external wheel portions 34b and 35b, respectively, for threading over external threads on the associated elongated members as one means for advancing and retracting the elongated members in their associated bodies.

These bodies or blocks 34 and 35 include depending portions 34a and 35a, respectively, arranged and dimensioned for a close slide-fitting relation in a plurality of apertures arranged in spaced relation about the top surface of the housing and specifically an aperture 36 at each of the corners in the top wall 12 of the housing and in a pair of spaced lugs or projecting members 37 on each end wall of the housing in spaced relation to the corners. Each projecting member 37 has similar apertures 39 of similar dimension to apertures 36 so that the depending portions 34a and 35a will fit into apertures 36 and 39, respectively. When the depending portions 34a and 34b are inserted into two of apertures 36 and 39 with the undersurfaces of the bodies seated on the top wall 12, they are thereby held against sliding movement when forces are applied to the roller member. When mounted on the housing the elongated members are in a triangular relationship with the roller at a convergent apex of the elongated member so as to resist a proportionate share of the vectorial forces exerted on the roller. With this mounting arrangement it is apparent that each roller member 29 may be easily positioned at a selected position above and in spaced relation to the work supporting surface and moved into position by rotating the wheels 34b and 35b to effect a desired shaping of the workpiece and the entire assembly may be easily removed from the work supporting surface as required.

For assistance in sliding a workpiece along the work supporting surfaces there is provided a roller member 40 inclusive of an elongated rod 41 having inturning end portions 41a and 41b and an intermediate portion 41c. A roller bearing 42 is mounted on the intermediate portion 41c and the intermediate and end portions are dimensioned so the end portions slidably fit into the apertures 39 on lugs 37 disposed along one side wall in a manner similar to the end walls so that the roller member 40 may therefore be positioned on and removed from the work surface as required.

More specifically now as to the rotary member 4, this member is generally hollow and is constructed of a plurality of separate parts which are assembled and disassembled to permit access to its interior. Only the portion of the structure disposed interiorly of the housing 3 and rotary member 4 to the left side of the axis of rotation of the rotary member has been shown in FIG. 2 as this interior structure is symmetrical about said axis of rotation.

Rotary member 4 includes a hollow lower piece 43 of generally cylindrical shaping disposed in an upright position, an intermediate piece 44 of generally flat cylindrical shaping covering the top opening in the lower piece and a top piece 45 of flat cylindrical shaping seated on the intermediate piece. The top piece has an interior recessed portion 45a and its outer peripheral surface is disposed in spaced relation to an inner annular surface of the housing forming the opening 16 in the top of the housing and is in spaced relation thereto so as to form a gap and rotate freely with respect thereto. A pin member 45b is disposed on an undersurface of the top piece 45 which fits in a recessed portion in the top of the intermediate piece for alinement of the two pieces and transmits forces from the intermediate piece 44 to the top piece 45.

The rack-type members 18 and 19 are disposed centrally of the recessed portion of the circular top piece 45 and extend generally radially thereof. These rack-type members are secured at their ends with an upstanding inner peripheral surface portion at the outer peripheral portion of the top piece. The top surfaces of the rack-type members are at the same elevation as the top surface of the outer peripheral portion of the top piece 45 to form the above referred to top work supporting surfaces in the same plane.

Top cover members 47 and 48 cover the recessed portions 45a between each side of the rack-type members and provide a top surface in coplanar relation therewith to complete the top planar work supporting surface generally designated 17 of the rotary member and provide additional support against radial forces applied to the rack-type members during shaping operation. A plurality of fastening members 46, preferably bolts as shown, are disposed circumferentially of the top piece and extend downwardly through a recessed portion in the cover members and then through the top piece 45 and intermediate piece 44 and thread into the top of the bottom piece 43 so as to hold the rotary member 4 as an integral assembly.

The rotary member 4 is supported within the housing 3 for rotary movement by means of an upstanding inner stationary member 51 secured to the bottom wall 15 and disposed about and concentric with the axis of rotation of the rotary member. A pair of opposing bearings 52 and 53 disposed in vertically spaced relation are carried on an outer surface of the inner member 51 and are secured at their outer peripheral surfaces to the inner surface of the hollow lower piece 43 through a plurality of circumferentially spaced rib members 54. In this manner, the rotary member 4 will rotate about a vertical axis of rotation within the housing 3.

A gearing system for further reducing the speed and increasing the torque to the rotary member is provided which is preferably of the planetary type and is disposed within the hollow interior of the rotary member. This gearing includes a generally cup-shaped member 55 with an inner annulus secured in a stationary position with a hollow depending lower end portion fitting over the iner stationary member 51 and attached thereto by a spline fit or the like. Gear teeth 55a are provided on the inner surface of the cup portion of member 55. A vertically disposed shaft 56 for rotating the rotary member about its axis of rotation is supported for rotary movement on a pair of spaced bearings 57 secured within the inner support member 51 and has a centrally disposed gear 58 mounted on its upper end having peripheral gear teeth. A plurality of outer gears 59, preferably three, having peripheral gear teeth disposed in circumferential and meshing relation with the central gear 58 and with the teeth on the inner peripheral surface of the inner cup member. Each outer gear 59 is provided with a pin member 61 at its central portion which extends upwardly into the intermediate piece 44 of the rotary member.

Thus, when the central shaft 56 is rotated, the central sun gear 58 imparts rotary movement to the three outer planet gears 59 at points radially outwardly from the shaft and each outer gear 59 rotates in meshing relation with the inner toothed annular surface or annulus within the stationary cup-shaped member. The rotary movement of the outer gears 59 is imparted to the rotary member assembly 4 through pin members 61. The torque to the rotary member is materially increased by applying the rotational movement of the shaft at a point substantially radially outwardly of its axis of rotation. A sprocket 60 of the chain type is shown as supported at the lower end of the shaft.

DRIVE

The drive assembly 8 for providing rotary motion to the shaft 56 is illustrated as of the electric motor driven type with speed reducing gearing on its output to meet the speed and torque requirements of the rotary member, but it is understood that other types of drives such as hydraulic drives also may be used. Known hydraulic motors could be mounted at the lower end of shaft 56.

The drive assembly 8 as shown in FIG. 1 and carried on the base 2 includes an electric motor 62 having its output shaft connected to the rotary member through a belt coupling 63, a transmission speed reducer 64, a gear reducer 65 and transmission coupling 9 in that order. The transmission speed reducer 64 is provided with a gear combination capable of being set for several different output speeds which is regulated by an associated lever 64a.

CONTROL

Referring now to FIG. 8, there is shown in schematic diagram form a preferred form of electric control circuitry operatively interconnected with the electric motor 62 above described. Electric power lines L1, L2 and L3 represent a typical three phase electric power source usually available in industrial plants and the electric motor 62 is of a known three-phase type capable of running in either direction by reversing the three phase power applied to two of its input terminals designated A, B and C. An electric interconnecting or switching assembly illustrated in the form of a reversible magnetic-type three phase starter inclusive of a line contact portion 67 and an interlock portion 68, each designated generally by blocks shown in dash lines, is connected between lines L1, L2 and L3 and the motor terminals A, B and C to directly regulate the starting, stopping and direction of rotation of the motor 62 in a sequence as described more fully hereafter.

For manually turning the motor and coil circuitry of the electric control hereafter described on and off, there is provided between lines L1, L2 and L3 and the contact portion 67 an on-off switch 69. Suitable overloads 71 are also provided between the switch 69 and contact portion 67.

The contact portion 67 includes a set of three normally open contacts 72, 73 and 74 which are operatively associated with a forward coil 75 disposed in the interlock portion 68. Contact 74 is connected between L1 and motor terminal C. Contact 73 is connected between L2 and terminal B and contact 72 is connected between L3 and terminal A. A set of three normally open contacts 76, 77 and 78 are provided which are operatively associated with a reverse coil 79 disposed in the interlock portion 68. Contact 76 is connected between L1 and terminal A. Contact 77 is connected between L2 and terminal B, and contact 78 is connected between L3 and terminal C.

The forward coil 75 is operatively interconnected with the forward set of contacts and similarly the reverse coil with the set of reverse contacts so that when the associated coil is energized by the electric power source, all three of the associated contacts close. In this manner, the power lines L1 and L3 are connected to different motor terminals C and A or A and C, respectively, to start motor to rotate in either the forward or reverse direction. When both coils are deenergized as shown, the motor will not run or stop, depending on its previous condition. One side of the forward and reverse coils 75 and 79 is connected at all times through line 81 having an overload protector to line L3 and is hereinafter referred to as the L3 side of the coils and to effect energization only when the L1 side is connected and disconnected in a manner as hereafter described.

The sequence of the motor operation may be regulated manually by means of a manual control stage 11 indicated schematically in FIG. 8 as a block in dash lines and identified structurally in FIG. 1 as a remote manual control station 11 or automatically by means of an automatic control stage 10 indicated schematically in FIG. 8 as a block in dash lines and contained in the box 10 of FIG. 1. In general, the manual and automatic control stages 11 and 10 are interconnected between power lines L1, L2 and L3 and the forward and reverse actuating coils 75 and 79.

Referring now specifically to the manual stage 11 as shown in the schematic diagram of FIG. 8, there is provided proceeding from top to bottom a forward switch 83, reverse switch 84, stop switch 85, run/jog switch 86, safety stop switch 87 and reset switch 88. These are preferably electric switches of the push button type and are biased to return to the position shown after pushing or depressing, except the run/jog switch 86 which is a two-position switch, and appear as push buttons of a similar numeral designation on the control station 11 as shown in FIG. 1.

The automatic control stage 10 includes a plurality of electric switches shown schematically in FIG. 8 and proceeding from top to bottom including a clockwise stop switch 91, a clockwise reverse switch 92, a counterclockwise stop switch 93, a counterclockwise reverse switch 94 and a safety stop switch 95. Each of these switches are in proximity to the peripheral surface of the rotary member to sense angular position thereof and preferably are carried in vertically spaced relation on the inner wall of the housing as shown in FIG. 2 and in spaced proximity to the periphery of the rotary member in the same order proceeding from top to bottom.

The outer peripheral surface of the side wall or more specifically the lower piece 43 of the rotary member has a plurality of circumferentially extending upstanding portions or ring-like members disposed in vertically spaced relationship along its lengthwise extent. Five of these ring-like members designated 97, 98, 99, 100, and 101 are shown in FIG. 2 proceeding from top to bottom and each carry an adjustable trip member which is operatively associated with one of the automatic electric switches carried on the side wall 14 of the housing.

As viewed in FIG. 2 from top to bottom, these trip members are hereafter referred to as the clockwise stop trip 103, clockwise reverse trip 104, counterclockwise stop trip 105, counterclockwise reverse trip 106 and the safety stop trip 107. Each trip member 103, 104, 105, 106 and 107 is disposed on ring-like members 97, 98, 99, 100 and 101, respectively, and extends outwardly radially thereof and each is interconnected therewith so as to slide circumferentially of the associated ring and lock at a selected position along its circumferentially extending surfaces. The trip members and their associated electric switches function as a means for sensing the angular position of the rotary member and energize or deenergize the forward and reverse coils in an automatic sequence of operation as described more fully hereinafter. While only one trip member per ring is shown and described, it is understood that for making a series of different angles in a workpiece more than one trip member may be disposed in circumferentially spaced relation on the same ring with the operator controlling the manual forward button 83 as described more fully hereafter.

The reset switch 88 has an electrically associated relay 110 designated generally as a block in dash lines inclusive of a pair of normally open relay contacts 111 and 112 and an operatively associated coil 113 for opening and closing these contacts. One side of the coil 113 is connected to L3 by line 81 and the other side of the coil 113 is connected through the reset switch 88 (when closed) to line L1 so that when the reset button is depressed or closed the associated contacts 111, 112 move to a closed position. Reset switch 88 performs a cancellation function and is the initial button pushed in the cycle of operation.

The manual safety stop switch 87 is connected in a series circuit with the automatic safety stop switch 95 and a foot actuated switch 115 mounted adjoining the rotary member and tripped by a flap 116 pivotally supported at the operator's station at one end of base 2 as shown in FIG. 1. These switches are normally closed in this series circuit which is connected through contact 112 (when closed) to L1 and through the coil 113 to L3. In this manner, when the reset switch or button is depressed or pushed, coil 113 is momentarily energized through the reset button to close contacts 111 and 112. After closing this series circuit including switches 87, 95 and 115, coil 113 is energized and the associated contacts 111 and 112 are closed. However, if one of the three serially connected switches is opened, then coil 113 is deenergized which ultimately stops electric motor 62.

The run/jog switch 86 has an upper run setting (shown) and a lower jog setting and has an electrically associated relay 117 designated as a block in dash lines inclusive of a pair of normally closed contacts 118 and 119 and an operatively associated coil 121 for opening and closing the contacts. One side of the coil 121 is connected to L3 and the other side of the coil is connected through the run/jog switch when set on the lower jog position and the safety contact 111 to L1 so that when the run/jog switch is manually pushed the coil 121 is energized and the associated contacts move to the other position herein referred to as open.

The interlock stage 68 includes a normally closed contact 122 and a normally open contact 123 operatively associated with the forward coil 75 and a normally closed contact 124 and a normally open contact 125 operatively associated with the reverse coil 79. The normally closed contact 122 of the forward coil is electrically connected in the L1 side of the reverse coil 79 and the normally closed contact 124 of the reverse coil is electrically connected in the L1 side of the forward coil. These normally open contacts 123 and 125 of the forward coil and reverse coils are connected in the switches of the manual and automatic stages so as to close and hold or lock associated of the coils in the energized condition until deenergized through the opening of one of the series switches in these circuits.

The above described electric components which are employed in manually energizing or actuating of the forward drive coil 75 to drive the rotary member 4 in the forward clockwise direction as viewed from the top of the rotary member as shown in FIGS. 1 and 5 includes on the L1 side an electrically interconnected series circuit comprising reverse contact 124, clockwise stop switch 91, forward switch 83 (when pushed), the stop switch 85 and relay contact 111.

The circuitry employed in manually energizing or actuating the reverse drive coil 79 to drive the rotary member in the reverse or counterclockwise direction (as viewed in FIGS. 1 and 5–7) includes on the L1 side an electrically interconnected series circuit comprising closed forward contact 122, counterclockwise stop switch 93, reverse switch 84 (when pushed), forward switch 83 (when not pushed), stop switch 85, and the safety relay contact 111.

A simple bending of a metal bar at one end by manual controlled operation will now be described with reference to FIG. 5 wherein metal bar 126 of a preselected length is shown disposed between upright work engaging members 5 and 6 with a collar member 27 positioned on member 5 and shown just prior to performing the bending operation. One work interrupting assembly 7 is secured on the work supporting surface at the upper lefthand corner and is disposed adjoining an intermediate portion of the bar 126.

Referring now to the control circuitry for a simple bending operation by manual control, prior to pushing either the forward or reverse manual switches 83 or 84 for manual operation the reset switch 88 is pushed to energize the coil 113 and close the contacts 111 and 112. The run/jog switch 86 is set in the lower jog position to energize the coil and move its contacts 118 and 119 to the open position. Then, if the forward switch 83 is pushed, the rotary member rotates in the forward clockwise direction so that the upstanding members 5 and 6 bend the bar at one end as shown. The reverse button 83 is then pushed and the rotary member turns in the reverse or counterclockwise direction. Pushing of the stop switch 85 which will stop the rotation in either direction, stops the rotary member.

A bending of a metal bar at both ends by automatic controlled operation will now be described with reference to FIG. 6 wherein a metal bar 127 of a preselected length is shown disposed between upright work engaging members 5 and 6 with a collar member 27 positioned on member 5 and shown just prior to the bending operation. A work interrupting assembly 7 is secured at both the upper right and lefthand corners of the housing and each is disposed adjoining a side of the bar 127.

Prior to automatic operation the apparatus is preset or programmed. This presetting or programming of selection of the trip members hereinabove described in a circumferential pattern on the rotary member is shown in FIG. 2 and is accomplished by selectively rotating the rotary member 4 by the manual control hereinabove described. In one arrangement for carrying out the bending of a bar into the shape shown in FIG. 6, the trip members and switches as shown and described are employed and it will be assumed the trip members have been suitably positioned to bend the bar 127 to the shaping as shown in FIG. 6.

In automatic operation for the shaping as shown in FIG. 6, the bar 127 is first positioned between the upstanding members with work interrupting assemblies 5 and 6. The reset switch 88 is pushed and then the run/jog switch 86 is set in the run position as shown. The manual forward switch 83 is pushed and the rotary member 4 rotates in the clockwise direction so as to shape the end of the bar while held in place by the interrupting assembly 7 disposed in the upper left corner. The position of the clockwise reverse trip 104 on the rotary member has been preset to engage the clockwise reverse switch 92, thereby deenergizing hold contact 123 for the forward coil 73 to deenergize the forward coil and at the same time the reverse coil 79 is energized through its connection to the L1 side through the series circuit of the closed contact 122, counterclockwise stop switch 93, clockwise reverse switch 92 and switches of manual control stage 11 and relay contact 111. The lock contact 125 is energized to lock the reverse coil in the energized position. Rotary member 4 then moves in the reverse or counterclockwise direction until the counterclockwise stop trip 105 engages the counterclockwise stop switch 93, at which time the upright work engaging members have returned to the neutral position and the reverse coil is deenergized by the opening of the circuit through the lock contact 125 and the rotary member 4 stops.

The other end of the bar 127 is then moved to the right and positioned between the upright members. The manual reverse switch 84 is pushed first to energize the reverse coil as above described. This turns the rotary member 4 in the counterclockwise direction to perform the bending or shaping function on the other or left end of the bar 127 and upon completion thereof the counterclockwise reverse stop trip 106 engages the associated switch 94 so as to open the circuit including its locking contact 125 and deenergize the reverse coil 79 to stop reverse or counterclockwise rotation while at the same time energizing the forward coil 75 through the L1 side by the series circuit of the contact 124, clockwise stop switch 91, the switches of the manual contact stage 11 and relay contact 111. Upon reaching the neutral position, the clockwise stop trip 103 engages the clockwise stop switch 91 so as to open the circuit including the lock contact 123 of the forward coil so that forward coil 15 is deenergized and the rotary member stops at the neutral position.

This same sequence of automatic operation may be provided to impart linear shaping in a bar 128 as illustrated in FIG. 7 wherein a bar 128 is shown in its initial position with its central portion between and directly engaged by the pin portions of upright members 5 and 6. In this arrangement, there is provided a work interrupting assembly at each corner or in each quadrant of the housing 3.

While only a single bending operation at each end of the bar has been used for purposes of illustration, it should be appreciated that by the addition of additional trip members per ring disposed in spaced relation and using the manual forward and reverse buttons that multiple bends may be easily performed at each end of a workpiece. It is also understood that as an alternative to the electric motor and control above described a hydraulic motor mounted below the rotary member may be provided with suitable valving responsive to similar trip members associated with the rotary movement of member 4 to provide the required stopping, starting and reversing thereof.

For essentially curved or curvilinear shaping of a workpiece, the above described apparatus may be modified as shown in FIGS. 9 and 10. Apparatus similar to that of FIG. 1 includes housing 3 and rotary member 4 mounted for rotary movement about a vertically disposed axis of rotation and carrying an upright member 5 disposed at the center of the rotary member which, as shown is for larger gauges of material, has a larger pin portion with the other upright member 6 in adjoining relation in rack-type members 18 and 19. A similar roller member 40 is provided at one side of the housing.

A drive assembly for movement of the workpiece in this arrangement includes an inner drive member 131 of generally cylindrical shaping which has a central bore provided therein and a bore offset from the center for sliding onto the pin portions of upright members 5 and 6. The lower portion 131a of the inner drive member 131 has gear teeth formed therein and a horizontally disposed plate portion 131b is provided to cover the gear teeth and provide a work supporting surface as shown.

Operatively associated with the inner drive member is an outer drive member 132 of generally cylindrical shaping having a lower gear portion 132a arranged in meshing relation with the gear portion 131a. The outer drive member is supported by associated yoke members 133 and 134 on threaded elongated members 135 and 136, respectively, adjustably carried adjoining the corners of the housing in the same manner as hereinabove described with reference to the work interruping assemblies 7.

In this form, the work interruping assembly 130 is generally similar to that shown in FIG. 1 with threaded elongated members designated 137 and 138 having a bearing housing and pin portions 139 and 140, respectively, at their inner ends for rotatably supporting a roller member 150 which directly engages and interrupts the direction of movement of a bar 151 being shaped. In this form a ball, roller or similar bearing surface will preferably be provided between adjoining surfaces of the housing 139 and roller 150 because of increased forces being applied thereto.

Rotation of member 4 in the clockwise direction as shown imparts rotary motion to the inner drive member 131 and through the gear portions rotation is imparted to outer drive members 132 in a counterclockwise direction so as to advance the workpiece or bar 151 therebetween. This bar 151 is directed into roller member 150 and bent with a continuous curve. The motor and gearing as above described is suitable for the form shown in FIGS. 9 and 10 but the only drive control necessary is that which will drive the rotary member at a constant speed in one direction.

Figure 11:
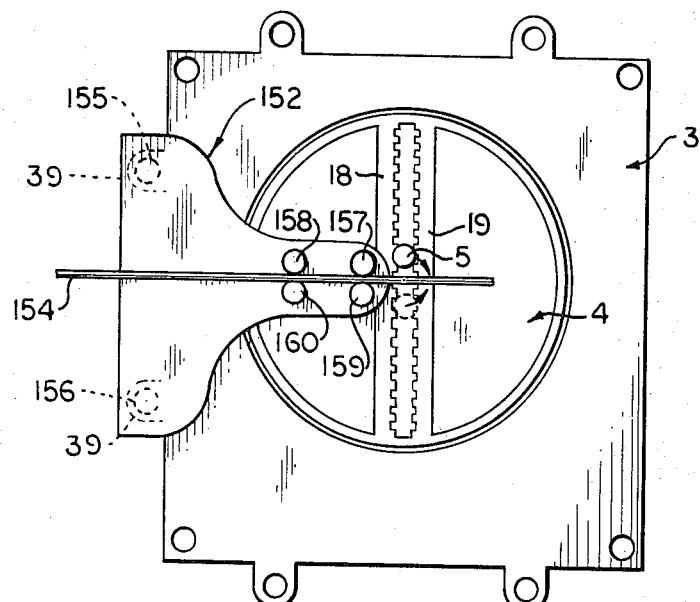
FIG. 11 is a top plan view of an alternative form of workpiece shaping apparatus embodying features of the invention which is particularly suitable for shaping workpieces of smaller sizes.
Figure 12:
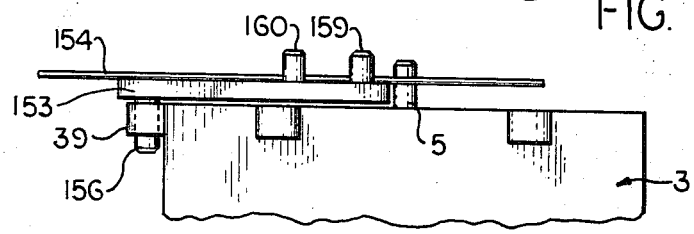
FIG. 12 is a fragmentary end elevation view of the apparatus shown in FIG. 11.

For shaping workpieces particularly of smaller sizes an arrangement of the type shown in FIGS. 11 and 12 may be utilized. In this arrangement the housing 3 and rotary member 4 carrying spaced rack-type members 18 and 19 and a single upright member 5 are similar to that above described with reference to FIG. 1.

A demountable stationary support member 152 is supported from the housing in overhanging relation thereto and terminates at its inner end at approximately the axis of rotation of the rotary member. This support member includes a T-shaped plate 153 on which a workpiece 154 to be shaped is disposed. Pin members 155 and 156 are secured in a depending manner to the undersurface of the outer wide end of the plate member for fitting in the spaced apertures 39 on the housing to hold the plate against slidable movement thereon and permit quick detachment therefrom.

Pairs of pin members 157, 158, 159 and 160 are disposed lengthwise and oppositely in spaced relation for positioning and holding the workpiece disposed therebetween for contacting the workpiece and altering its direction of imparted movement by the rotation of the movable upstanding member 5 disposed outwardly of the axis of rotation.

Figure 13:
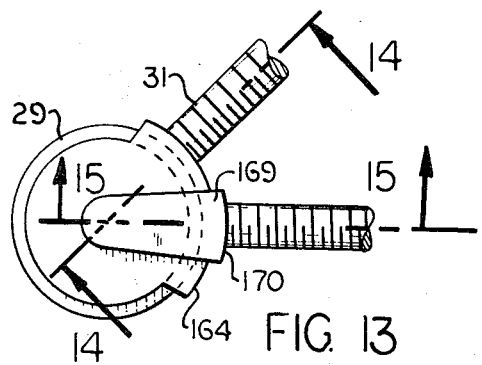
FIG. 13 is a fragmentary top plan showing one form of support for the roller member shown in FIG. 1.
Figure 14:
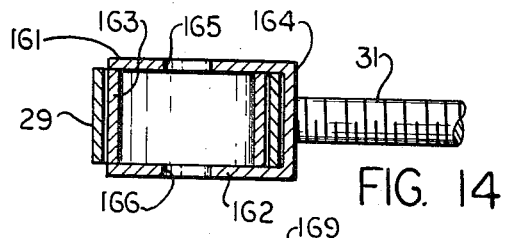
FIG. 14 is a sectional view taken along line 14—14 of FIG. 13 showing the bearing housing mounted on the end of one of the elongated members.
Figure 15:
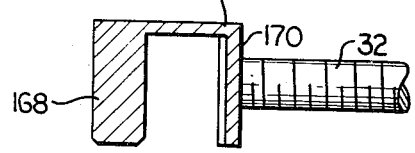
FIG. 15 is a sectional view taken along line 15—15 of FIG. 13 showing the pivot pin mounted on the other of the elongated members.

While it is understood that the roller member 29 shown in FIG. 1 may be rotatably mounted on the adjoining elongated members in various ways, a preferred arrangement is shown in an assembled view in FIG. 13 and a disassembled view in FIGS. 14 and 15. As shown in detail the roller 29 is essentially a sleeve carried in a bearing housing having spaced upper and lower circular walls 161 and 162 held in spaced relation by a cylindrical space member 163 which forms an internal bearing surface for roller 29. An outer wall 164 joins the inner ends of the upper and lower walls and spaced outwardly of the roller which forms an outer bearing surface against which the roller 29 is moved by the workpiece. The end of the elongated member 31 is secured to the outer wall 164. Apertures 165 and 166 are provided in the upper and lower walls at the axis of the roller.

A pivot or pin member 168 which detachably slides into the apertures of the bearing housing is mounted on the end of the other elongated member 32 by means of an upper arm 169 bridging the top of the pin and peripheral end wall 170 radially outwardly of the outer wall 164 and secured to the elongated member 32 so that vectorial forces applied to the outer wall 164 are directed through the end wall 170 along member 32 as well as member 31. Further it should be apparent that the elongated members are easily detached by pulling the pin from the apertures in the bearing housing.

Figure 16:
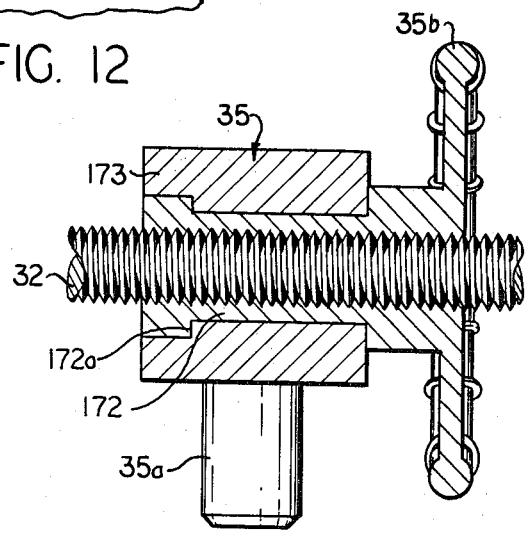
FIG. 16 is a sectional view of a body of the type shown in FIG. 1 illustrating one form of sleeve member arrangement for moving the elongated member through the body mounted on the housing.

Referring now to FIG. 16 there is shown one arrangement for advancing and retracting the elongated members hereinabove described. Using block 35 for illustration purposes there is shown and elongated member 32, a movable sleeve member 172 disposed for rotation in a bore of an outer stationary portion 173. The sleeve member is provided with an internally threaded bore threaded on the elongated member so that rotation of the handle portion 35b connected to the sleeve member moves the elongated member along the block 35. An inner flange portion 172a is provided on the sleeve member for engaging the stationary portion 173 to resist forces applied to the elongated member.

While the invention has been described with reference to particular apparatus, there is no intent to limit the spirit and scope of the invention to the precise details except as defined in the appended claims.

We claim:

1. Apparatus for shaping various sizes of pliable bars, rods and the like comprising a stationary housing, a rotary member of generally hollow cylindrical shaping supported for rotary movement in said housing, said rotary member having a top closure portion for supporting a workpiece during shaping, at least one upstanding member disposed on said rotary member for contacting one portion of the workpiece to impart movement thereto, drive means for rotating said rotary member to thereby impart movement to said workpiece, said drive means including a motor, a centrally disposed rotary input shaft disposed in the rotary member arranged to receive power from the motor, a planetary type gear set in the rotary member coupled between the input shaft and the top closure portion for applying rotary forces to the rotary member through said gear set at a distance substantially outwardly of its axis of rotation, and means supported from said housing for contacting another portion of the workpiece and altering the direction of imparted movement of the workpiece so as to effect a desired shaping of the workpiece.

2. Apparatus as set forth in claim 1 wherein said planetary gear set includes a central sun gear mounted on the input shaft, a cup-shaped member with an inner annulus provided with gear teeth arranged along the inner side of the rotary member, and a plurality of outer planet gears meshing between the sun gear and the annulus teeth, each said planet gear having a central pin extending into the top closure portion to transmit rotary motion thereto.

3. Apparatus for shaping various sizes of pliable bars, rods and the like comprising a stationary housing, a rotary member of generally cylindrical shaping supported for rotary movement in said housing about an upright axis of rotation, said housing and rotary member having a top surface portion for jointly supporting a workpiece during shaping, at least one upstanding member on said rotary member for contacting one portion of the workpiece disposed therebetween to impart movement thereto, said upstanding member having a base portion with uniformly spaced serrated sides and said rotary member having a radially extending slotted portion with opposed uniformly spaced serrated sides to removably receive and support said base portion at one of a plurality of selected increments radially of the top circular surface portion of said rotary member, drive means for rotating said rotary member to thereby impart movement to said workpiece, and means supported from said housing for contacting another portion of the workpiece and altering the direction of imparted movement of the workpiece so as to effect a desired shaping of the workpiece.

4. Apparatus as set forth in claim 3 wherein said uniformly spaced serrated sides are gear teeth.

5. Apparatus for shaping various sizes of pliable bars, rods and the like comprising a stationary housing, a rotary member of generally cylindrical shaping supported for rotary movement in said housing, said housing and rotary member having top surface portions for jointly supporting a workpiece during shaping, a pair of upstanding members disposed in spaced relation on said rotary member for contacting one portion of the workpiece disposed therebetween to impart movement thereto, drive means for rotating said rotary member to thereby impart movement to said workpiece, and work interrupting means supported from said housing for contacting portions of the workpiece at selected locations above the rotary member and altering the direction of imparted movement of the workpiece so as to effect a desired shaping of the workpiece, said work interrupting means including a plurality of interchangeable, independent, assemblies, each adapted to removably mount on the top of the housing at circumferentially spaced intervals with an extended portion overlying each of the four quadrants of the rotary member, each said assembly being of a generally triangular configuration including a pair of rod-like members pivotally connected at an apex above the rotary member and diverging outwardly toward opposite ends, a work contacting roller mounted at the apex of said rod-like members, and a support block movably mounted on each rod-like member having a portion supported on the housing, the blocks for each pair of rod-like members being supported at spaced points, and means to move each rod-like member in an extensible and retractable action relative to its associated support block to vary the position of said roller member relative to the top of said rotary member.

6. Apparatus for shaping various sizes of pliable bars, rods and the like comprising a stationary housing, a member of generally cylindrical shaping disposed in an upright position for rotary movement in a recess in said housing, said housing and rotary members having substantially coplanar top surface portions for jointly supporting a workpiece during shaping, a pair of upstanding members disposed in spaced relation on said movable member for contacting one portion of the workpiece disposed therebetween to impart movement thereto, each of said upstanding members including an upper pin-shaped portion and a lower oblong portion having serrations formed on opposite side surfaces, motor means for rotating said rotary member to thereby impart movement to said workpiece along said top surface portions, means for automatically controlling the direction and extent of the movement of said rotary member in accordance with the preselected program, means supported from said housing in spaced proximity to said upstanding members for contacting another portion of the workpiece and altering the direction of imparted movement of the workpiece, means inclusive of a pair of rack-type members, each said rack-type member having serrations extending along one side for receiving said serrated portions of the lower portions of said pair of upstanding members for changing the points of contact of the workpiece by said upstanding members, and means inclusive of at least a pair of perforated block members having internal threads and supported from a portion of said housing in spaced relation, each said block member having a threaded member threaded therein joined at one end by a cylindrical body for contacting another portion of the workpiece for changing the point of the alteration of the direction of movement of the workpiece so as to effect the desired shaping of the workpiece.

7. Apparatus for shaping various sizes of pliable bars, rods and the like comprising a stationary housing, a rotary member of generally cylindrical shaping supported for rotary movement on said housing, said housing having top surface portions for supporting a workpiece during shaping, an upstanding member removably mounted at a selected position along the radius of the circular top of said cylindrical rotary member for contacting one portion of the workpiece to impart movement thereto, drive means for rotating said rotary member to impart movement to said workpiece, and a stationary support member removably mounted on said housing inclusive of an elongated plate portion extending over a portion of the top of said rotary member on which a workpiece is disposed, a depending portion at one end of the plate portion adapted for detachably seating on a top surface of the housing adjoining its upright walls to hold said plate from spaced points thereon against sliding movement, and upstanding portions disposed in spaced relation on said plate portion and in proximity to said upstanding member for slidably receiving and contacting another portion of the workpiece disposed therebetween and altering the direction of imparted movement of the workpiece so as to effect a desired shaping of the workpiece.

8. Apparatus for shaping various sizes of pliable bars, rods and the like comprising a stationary housing, a rotary member of generally cylindrical shaping supported for rotary movement in said housing, said housing have top surface portions for supporting a workpiece during shaping, a first rotary drive member disposed for conjoint rotation with said rotary member, a second rotary drive member removably supported at spaced points of support on said housing in spaced proximity to said first drive member and rotatably coupled in a driven relation with said first drive member, said first and second drive members having spaced roller portions for contacting one portion of the workpiece disposed between said drive members in friction engaging relation to the roller portions to impart movement thereto, drive means for rotating said rotary member to thereby impart movement to said workpiece, and means including a roller portion removably supported from said housing from spaced points of support on the housing for contacting another portion of the workpiece and altering the direction of imparted movement of the workpiece so as to effect a desired shaping of the workpiece, the roller portion of said second drive member and workpiece contacting means being disposed at the intersection of convergent lines through the associated of said spaced points of support.

9. Apparatus as set forth in claim 8 wherein said second drive member is rotatably coupled to said first drive member by meshing gear portions arranged coaxially on associated drive members.

10. A work interrupting assembly adapted for use with apparatus for shaping workpieces inclusive of a stationary housing having a top work supporting surface and a rotary member arranged in the housing for imparting movement to a workpiece positioned on the housing, said assembly comprising a roller member having peripheral work contacting surface portions and means for mounting said roller above the top surface and inwardly of the upright walls of the housing from spaced points of support on the housing, said mounting means including an extensible and retractable elongated portion arranged at one end for carrying said roller about an upright axis of rotation and a base portion supporting said elongated portion adapted for detachably seating on a top surface of the housing adjoining its upright walls and held at spaced points thereon against sliding movement.

11. A work interrupting assembly as set forth in claim 10 wherein said elongated portion includes a pair of rod-like members, one said rod-like members having a housing at one end for rotatably supporting said roller and the other of said rod-like members having a pivot pin at one end adapted to detachably mount in said roller housing to pivot said rod-like members toward and away from each other about said axis.

12. A work interrupting assembly as set forth in claim 10 wherein said elongated portion includes a pair of rod-like members having external threads adapted to thread into separate spaced bodies forming said base portion to position said roller in spaced relation to said bodies, each said body having an internal threaded portion for threading on said rod-like member for advancing and retracting the rod-like member in the body upon rotation of said internal threaded portion.

13. A work interrupting assembly as set forth in claim 10 wherein said base portion includes separate spaced bodies having depending portion arranged for seating in spaced aperture in spaced relation on the top surface of the housing.

14. A work driving assembly adapted for use with apparatus for shaping workpieces inclusive of a stationary housing having a top work supporting surface and a rotary member arranged in the housing for imparting movement to a workpiece positioned on the housing, said assembly comprising a drive member having peripheral work contacting surface portions and means for mounting said drive member above the top surface and inwardly of the upright walls of the housing from spaced points of support on the housing inclusive of a base portion adapted for detachably seating on a top surface of the housing and held at spaced points thereon against sliding movement and gear means arranged coaxial with said drive member adapted to receive rotary power transmitted from the rotary member during rotation thereof.

15. Apparatus as set forth in claim 5 wherein said housing is generally box-like in shape and includes an aperture in each corner and an aperture spaced from the corner along an adjacent wall to receive depending extensions on the support blocks of said work engaging assemblies to support said assemblies at each of the corners of said housing.

16. Apparatus for shaping various sizes of pliable bars, rods and the like comprising a stationary housing, a member of generally cylindrical shaping disposed on an upright position for rotary movement in a recess in said housing, said housing and rotary members having substantially coplanar top surface portions for jointly supporting a workpiece during shaping, at least one of the upstanding members disposed on said movable members for contacting one portion of the workpiece disposed therebetween to impart movement thereto, a reversible motor for rotating said rotary member in either direction to thereby impart movement to said workpiece along said top surface portions, and a control circuit for regulating the extent of movement of said rotary member by said motor means in either direction including a manual portion for hand operation and an automatic portion responsive to the angular position of the rotary member for regulating the motor means in a preselected starting, stopping and reversing sequence between preselected outer limits during movement in either direction and a preselected inner limit between said outer limits. to effect a desired shaping in a workpiece, said circuit including a portion to manually cancel any limit in the automatic operation at any time during the automatic sequence.

17. Apparatus as set forth in claim 16 wherein said automatic portion includes a series of trip members, each associated with an electric switch in the circuit including a stop trip member and a reverse trip member for both clockwise and counterclockwise directions, each said trip member being arranged on one of a series of separate rings on the circumference of the rotary member arranged along its length, each said trip member being adjustable to a selected setting circumferentially of the ring to sense any angular position of the rotary member when moved in either direction.

References Cited

UNITED STATES PATENTS

| | | | |
|---|---|---|---|
| 3,393,543 | 7/1968 | Van Gelder | 72—26 |
| 3,426,562 | 2/1969 | Inda | 72—24 |
| 2,565,940 | 8/1951 | Armstrong et al. | 72—217 |
| 2,621,702 | 12/1952 | Peddinghaus et al. | 72—157 |
| 3,145,756 | 8/1964 | Hill | 72—7 |
| 3,151,656 | 10/1964 | Brede | 72—157 |
| 3,156,287 | 11/1964 | Munro | 72—8 |
| 3,285,048 | 11/1966 | Eskilson | 72—156 |
| 2,335,028 | 10/1969 | Rose et al. | 72—171 |

RICHARD T. HERBST, Primary Examiner

M. J. KEENAN, Assistant Examiner

U.S. Cl. X.R.

72—170